United States Patent [19]

Gonzalez

[11] Patent Number: 4,829,708
[45] Date of Patent: May 16, 1989

[54] PLANT CARE APPARATUS

[76] Inventor: Samuel Gonzalez, 12001 Biscayne Blvd., #8513, Miami, Fla. 33181

[21] Appl. No.: 115,847

[22] Filed: Nov. 2, 1987

[51] Int. Cl.$^4$ .................. A47G 7/02; A01G 27/00
[52] U.S. Cl. .................................. 47/39; 47/79; 47/59; 222/457
[58] Field of Search ............. 47/59, 62, 63, 64, 79–83, 47/39; 222/55, 58, 457, 420, 422, 650; 248/128, 146

[56] References Cited

U.S. PATENT DOCUMENTS

| 2,134,214 | 10/1938 | Storck | 222/457 |
|---|---|---|---|
| 2,647,266 | 8/1953 | Vierra | 222/457 |
| 2,948,238 | 8/1960 | Hoffman . | |
| 2,990,647 | 7/1961 | Himebaugh . | |
| 3,168,224 | 2/1965 | Rios | 47/79 |
| 3,542,069 | 11/1970 | Ollison | 47/79 |
| 4,042,150 | 8/1977 | Roos | 47/79 |
| 4,574,520 | 3/1986 | Arledge | 47/59 |
| 4,578,897 | 4/1986 | Pazar et al. . | |

FOREIGN PATENT DOCUMENTS

| 286331 | 9/1965 | Australia | 47/79 |
|---|---|---|---|
| 201922 | 7/1958 | Austria | 47/79 |
| 601788 | 7/1960 | Canada . | |
| 2532315 | 1/1977 | Fed. Rep. of Germany | 47/79 |
| 2512638 | 3/1983 | France . | |
| 35824 | 1/1965 | German Democratic Rep. . | |
| 86675 | 12/1955 | Norway | 47/79 |
| 116795 | 7/1944 | Sweden | 47/79 |
| 958150 | 5/1964 | United Kingdom | 47/79 |

Primary Examiner—Danton D. DeMille
Attorney, Agent, or Firm—Henderson & Sturm

[57] ABSTRACT

A plant care apparatus having a container for holding a liquid of water or water with fertilizer to be delivered to plants. The container has an outlet opening in the bottom thereof, a fill opening in the top and a way to seal the top of the container from entry of atmospheric air. A consistent pressure chamber is disposed below the container outlet opening for holding a predetermined amount of liquid which drains from the container. An air control passageway leading from the outlet opening of the container down to a predetermined level in the consistent pressure chamber causes the liquid from the consistent pressure chamber to fill until it reaches the predetermined level and closes the passageway. Once this passageway is closed, it prevents air from entering the container and thereby prevents the liquid from flowing. At least one accumulation chamber is provided below the consistent pressure chamber. A metering valve is disposed between each accumulation chamber and the consistent pressure chamber for controlling the amount of dripping of fluid from the consistent pressure chamber to each respective accumulation chamber. A level responsive device is connected to the accumulation chamber for causing each accumulation chamber to fill and then automatically empty once the liquid in the accumulation chamber reaches a predetermined level. When the accumulation chamber empties, a tube is provided to direct the fluid flow to a potted plant or the like.

12 Claims, 3 Drawing Sheets

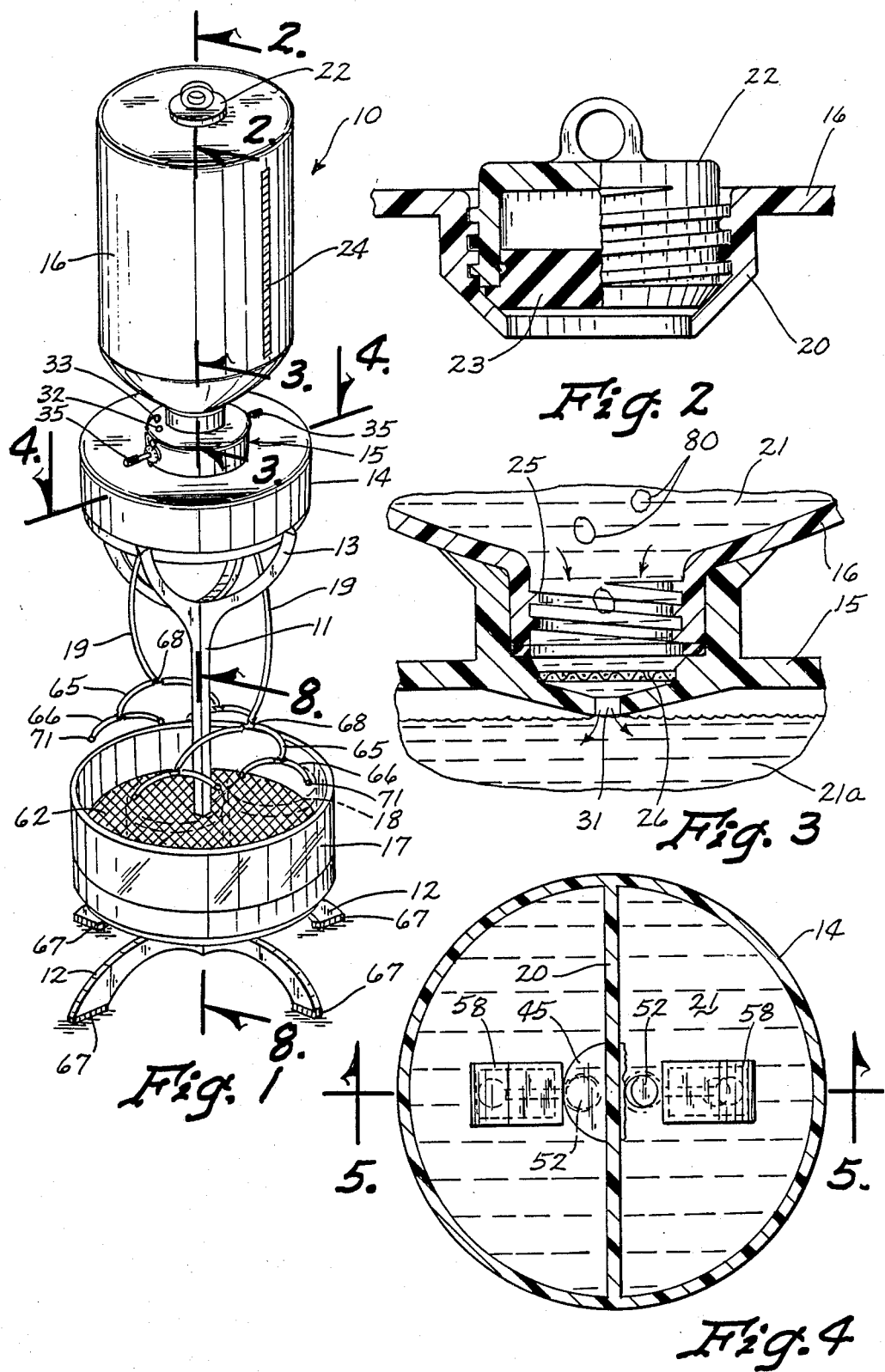

PLANT CARE APPARATUS

TECHNICAL FIELD

The present invention relates generally to an apparatus for watering and fertilizing plants, and more particularly to an automatic apparatus for performing this function.

BACKGROUND ART

Indoor potted plants require a great deal of care. Such plants must be watered on a regular basis with just the right amount of water during each watering session.

Many plants have died because the owner was either too busy with other things or was on vacation or the like. While it is most common that plants die from underwatering, plants can also die from overwatering or not receiving an the proper amount of fertilizer.

Certain types of waterers have been devised which have a tank of water or water with fertilizer mixed in it which is allowed to slowly drain into a potted plant or the like. A major problem with such devices is that when they are full of liquid, the liquid flows out more quickly than when they are low on liquid. Furthermore, in general it is impossible to use such a device to water in intervals as is the normal manner of caring for plants since such devices are usually of a type which continuously drip liquid until the liquid is gone. Consequently, these devices tend to provide too much liquid during the times that they are in use and then become depleted too soon and produce long periods of time when before they are filled when the plants are provided with no liquid at all. Such watering devices require almost as much care as the plants themselves.

Consequently, there is a need for a plant watering apparatus which will provide only the proper amount of water or water with fertilizer at predetermined intervals.

DISCLOSURE OF THE INVENTION

The present invention relates generally to a plant care apparatus having a container for holding a liquid such as water or water with fertilizer to be delivered to plants. The container has an outlet opening in the bottom thereof, a fill opening in the top and a structure to seal the top of the container from entry of atmospheric air. A consistent pressure chamber is disposed below the container outlet opening for holding a predetermined amount of liquid which drains from the container. An air control passageway leading from the outlet opening of the container down to a predetermined level in the consistent pressure chamber causes the liquid from the consistent pressure chamber to fill until it reaches the predetermined level, at which time it closes the passageway. Once this passageway is closed, it prevents air from entering the container and thereby prevents the liquid from flowing, since the container is not vented. The consistent pressure chamber does, however, have a vent therein.

At least one accumulation chamber is provided below the consistent pressure chamber and this accumulation chamber has an inlet and an outlet. A metering valve is disposed between each accumulation chamber and the consistent pressure chamber for controlling the amount of dripping of fluid from the consistent pressure chamber to each respective accumulation chamber.

A level responsive device is connected to the accumulation chamber for causing each accumulation chamber to fill and then automatically empty once the liquid in the accumulation chamber reaches a predetermined level. When the accumulation chamber empties, a tube is provided to direct the fluid flow to a potted plant or the like.

An object of the present invention is to provide an improved plant care apparatus.

Another object of the present invention is to provide a plant care apparatus which will dump a predetermined amount of liquid into potted plants at predetermined intervals.

A further object of the present invention is to provide plant care apparatus of the aforementioned type which has an adjusting valve for adjusting the interval at which the predetermined amount of liquid will be dumped to the potted plants.

A further object of the present invention is to provide a plant care apparatus of the aforementioned type which is mounted on a vertical stand which will also hold potted plants in a moist atmosphere conducive to plant growth.

A still further object of the present invention is to provide an improved magnetic dump valve which holds liquid in an accumulation chamber until the weight of the liquid overcomes a magnetic force holding the valve closed.

Other objects, advantages, and novel features of the present invention will become apparent from the following detailed description of the invention, when considered in conjunction with the accompanying drawings.

BRIEF DESCRIPTION OF THE DRAWINGS

FIG. 1 is a perspective view of a preferred embodiment of the present invention;

FIG. 2 is an enlarged cross sectional view taken along line 2—2 of FIG. 1;

FIG. 3 is an enlarged partial cross sectional view taken along line 3—3 of FIG. 1;

FIG. 4 is an enlarged partial cross sectional view taken along line 4—4 of FIG. 1;

BEST MOST FOR CARRYING OUT THE INVENTION

Figure 5:
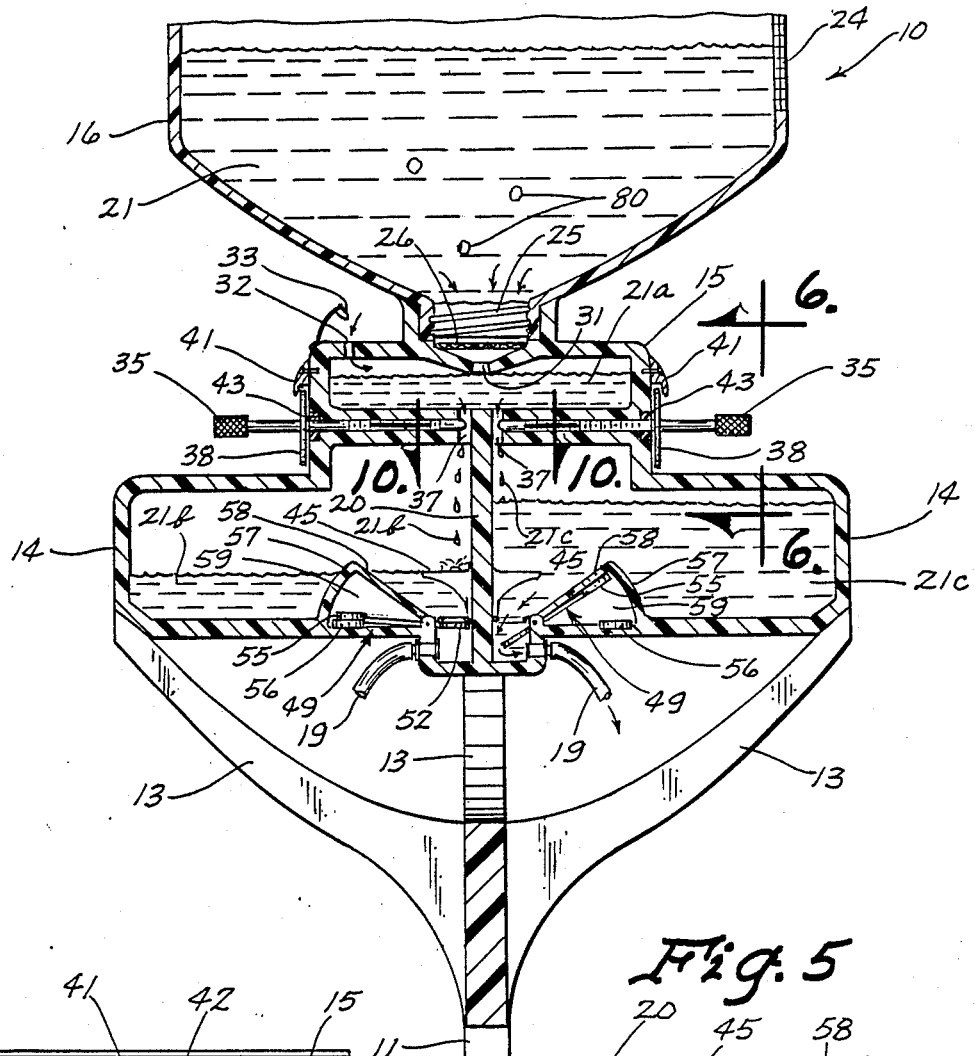
FIG. 5 is an enlarged partial cross sectional view taken along line 5—5 of FIG. 4.

Referring now to the drawings, wherein like reference numerals designate identical or corresponding parts throughout the several views, FIG. 1 shows a plant care apparatus (10) constructed in accordance with the present invention. The plant care apparatus (10) includes a frame supported on legs (12) on a floor to hold the apparatus (10) in the position shown in FIG. 1. Frame legs (13) hold a pair of accumulation chambers (14), and these accumulation chambers (14) have a consistent pressure chamber (15) integrally molded to the top thereof. A liquid container (16) is attached to the top of the consistent pressure chamber (15) for holding water or water and fertilizer.

Just above the legs (12) is a clear plastic tray (17) for holding pots (18) which can have plants growing therein. A conduit harness (19) leads from the accumulation chamber (14) to the pots (18) in the tray (17).

Referring now to FIG. 5, it is noted that the container (16) is provided for holding a liquid (21) preferably having fertilizer dissolved therein. The top of the container has a fill spout (20) and a closure plug (22) for tightly closing with a rubber seal (23) against a lower inwardly extending wall of fill spout (20) once the container (16) has been filled. The container (16) is preferably transparent so that it can be observed how much liquid (21) is contained therein and furthermore an indicia strip (24) is mounted in or to the side of the container (16) for quantifying the volume disposed within the container (16).

Referring to FIG. 3, it is noted that the bottom of the container (16) also includes a threaded portion (25), which can be closed, and a filter or strainer member (26) for keeping the apparatus below the strainer (26) clean. It is to be understood of course, that this strainer (26) can readily be removed for cleaning when the apparatus is not in use.

The consistent pressure chamber structure (15) has a chamber (30) therein and a passageway (31) which leads from the bottom of the container (16) to the chamber (30). A vent (32) allows atmospheric air to enter the chamber (30) although this vent (32) can be closed by a closure (33) when the container (16) and chamber (30) is being filled. When in operation, the plug (33) must always be removed and in the position shown in FIG. 5.

The liquid (21a) in the chamber (30) will always tend to return to the predetermined level shown in FIG. 5 just at the bottom of the passageway opening (31). The reason for the level being maintained as such is that since the container (16) is sealed and not vented at the top thereof, the liquid (21) cannot flow out of the container (16) without some air entering the container (16). Consequently, as water drains out in drips (21b and 21c) a small amount of air (80) will be allowed to enter the chamber (30) and pass up through the passageway (31) and up to the top of the liquid (21) in the container (16). When that happens, a very small amount of water will be allowed to enter the chamber (30) until the water (21a) again achieves the predetermined level shown in FIG. 5, whereupon the flow will cease from to flow through the passageway (31).

Figure 10:
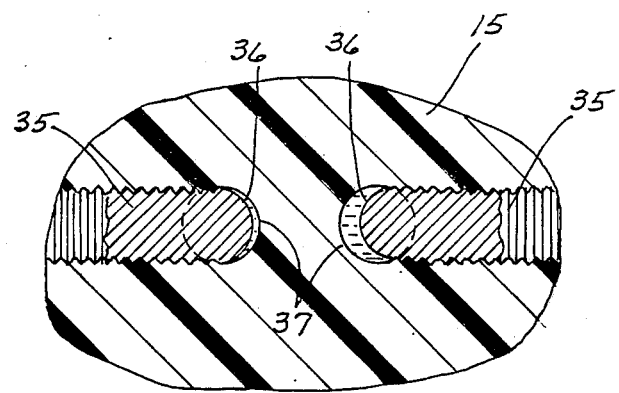
FIG. 10 is an enlarged partial cross sectional view taken along line 10—10 of FIG. 5 and showing one of the metering valves in more of an open position than the other one.

Referring to FIGS. 5 and 10, it is noted that metering valves (35) have a metering end (36) thereon, as is shown in FIG. 10 which can either open or close passageways (37). As shown in FIG. 10, the metering valve on the left is shown allowing less flow than the metering valve (35) on the right.

Figure 6:
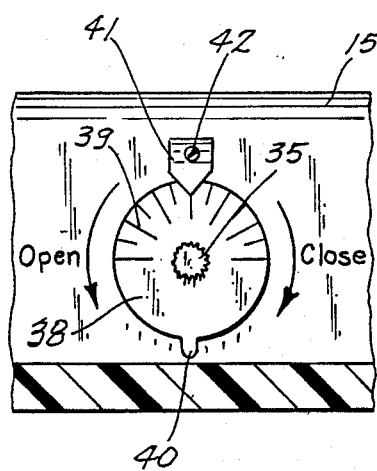
FIG. 6 is an enlarged partial cross sectional view taken along line 6—6 of FIG. 5.

Referring to FIG. 6, it is noted that a timing wheel (38) is provided with indicia marks (39) thereon and a pointer/stopper (40). A pointer (41) having a bolt (42) holding it in place and extending therethrough allows the metering valves (35) to essentially be returned one way or the other by only one turn because the extension (40) will abutt the pointer (41) and prevent further movement. As indicated in FIG. 6, movement in a counter-clockwise direction will open the metering valve further and allow more flow and rotation in a clockwise direction will allow less flow through the passageway between the metering end (36) of the metering valve (35) and the passageway (37) through the housing of the consistent pressure chamber (15). Referring to FIG. 5, it is noted that O-rings (43) are provided for sealing the metering valve shaft (35).

Referring to FIG. 5, it is noted that as the water drips (21b and 21c) down into the accumulation chambers, of which there are two as shown in FIGS. 4 and 5, the liquid (21b) will tend to accumulate in the left side chamber as the drops (21b) drop down onto a drip guard (45). The drip guard (45) prevents the drops (21b) from landing directly on the dump valve (49) shown in FIGS. 5 and 7.

Figure 7:
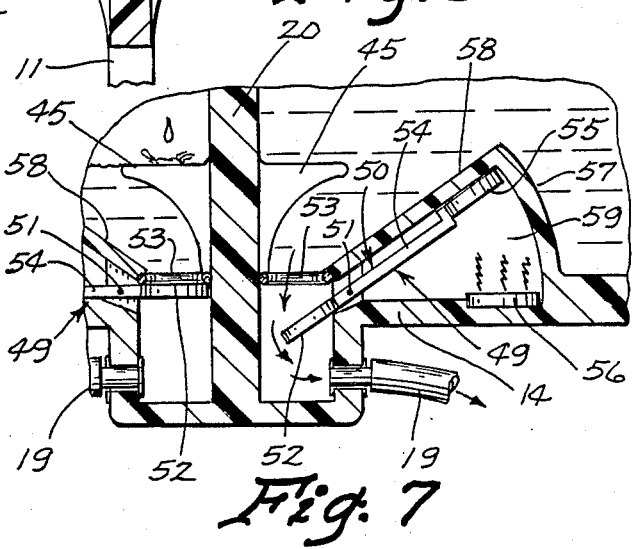
FIG. 7 is an enlarged partial cross sectional view like FIG. 5, but showing the dump valves at the bottom of the accumulators in more detail.

Referring now to FIG. 7, it is noted that the dump valve (49) includes a lever (50) which is pivoted by pin (51) to the housing (14). One short end (52) of the lever (50) is provided for sealing abuttment with a rubber O-ring (53) in the outlet of each accumulation chamber (14). The other end (54) of the lever (50) is longer and has a portion (55) thereon which is attracted by the magnet (56). It will be understood of course, that (55) could be the magnet and (56) could be a piece of metal which is attracted to magnets and still fall within the scope of this invention. The walls (57 and 58) generally prevent water from entering the chamber (59).

Figure 8:
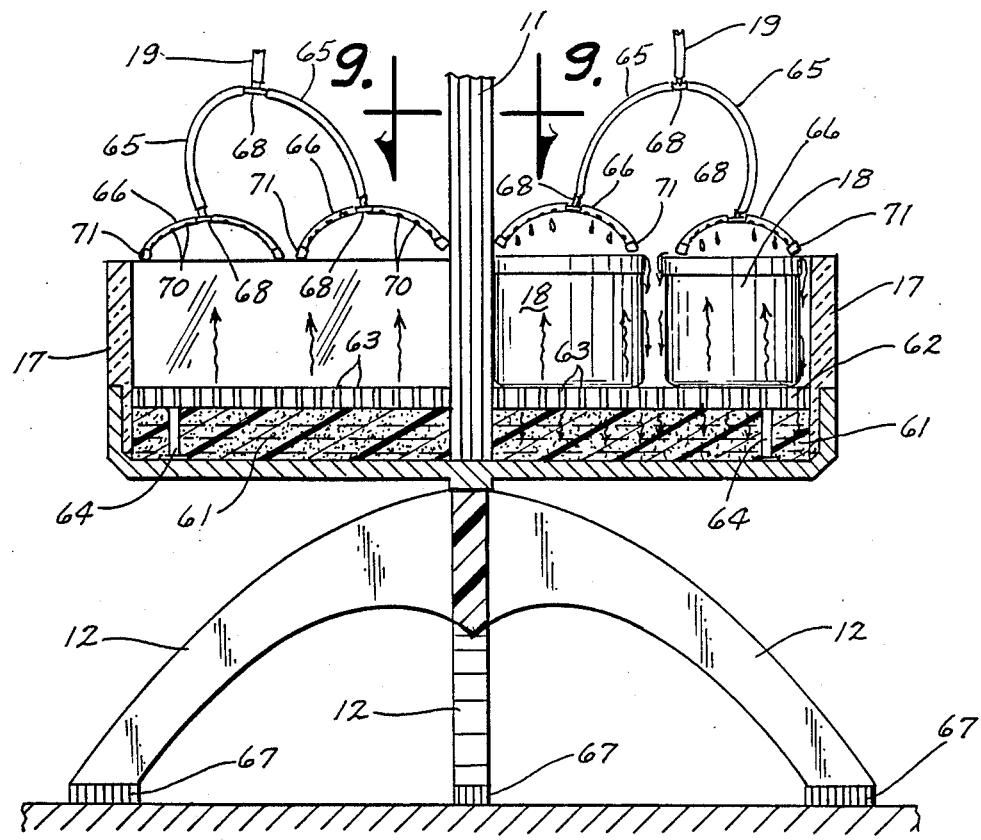
FIG. 8 is a cross sectional view taken along line 8—8 of FIG. 1.

Referring now to FIG. 8, it is noted that a clear plastic tray (17) has a floor (60) therein which has an absorbent sponge member (61) resting thereon. A rigid plastic grid (62), having a plurality of openings (63) extending therethrough, is supported in the position shown in FIG. 8 by a plurality of legs (64) which permit the pots (18) to be supported on the grid (62) without smashing the absorbent sponge (61). Consequently, the absorbent sponge (61) can absorb any overflow liquid or any liquid which runs through a vent hole in the bottom of the pots (18).

Figure 9:
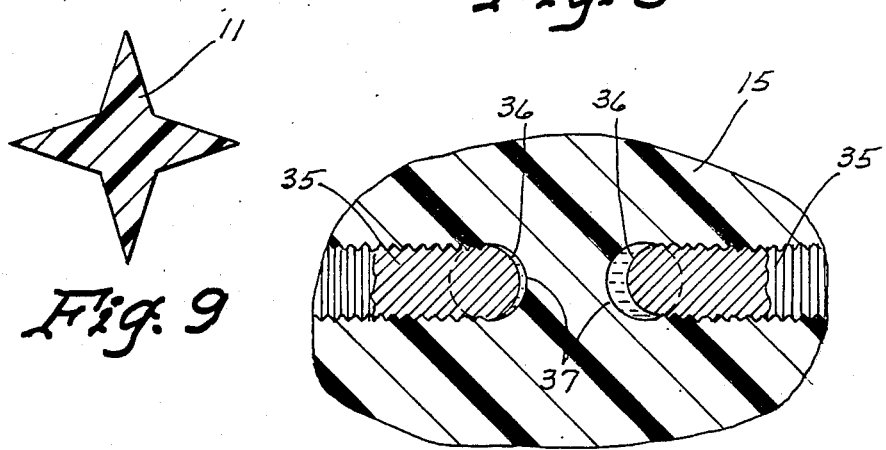
FIG. 9 is a cross sectional view of the frame taken along line 9—9 of FIG. 8.

Referring to FIG. 9, it is noted that the frame (11) is made of the cross sectional shape shown in FIG. 9 so that it can be small and yet strong.

In operation, potted plants (18) would be placed in the tray (17) as shown in FIG. 8 and as shown in dashed lines in FIG. 1. Then the liquid conduits (19), having a harness (65) thereon leading to conduit (66) which have holes therein, will be placed over the top of the pots (18). The vent plug (33) shown in FIG. 5 would be placed into the vent opening (32) and the fill plug (22) shown in FIGS. 1 and 2 would be removed. The container (16) would then be filled with water or water mixed with a fertilizer.

Once the container is filled, then the plug (33) shown in FIG. 5 would be removed and the apparatus would be in operation. First of all, the water would flow down through the passageways (37) in a dripping fashion past the metering valves (35) as is shown in FIGS. 5 and 10. The rate of flow of the liquid past metering valves (35) can be adjusted by turning the valve (35) in either direction as shown in FIG. 6 as desired. The quicker that the accumulation chamber (14) fills, the quicker that particular side will dump out through conduit (19).

When the liquid (21c) in the right side accumulation chamber (14) gets to the predetermined level shown in FIG. 5, then the weight of the water (21c) impinging upon portion (52) of dump valve (49) will be sufficient to force the dump valve (49) to open by overcoming the force between the magnet (56) and the metal portion (55) on the lever (50). Once the liquid (21c) has dumped out of the right side accumulation chamber (14) then, because the weight of the metal (55) is greater than the weight of portion (52), the dump valve (41) will move to a closed position, for example as shown by the dump valve (49) on the left side of FIG. 5.

Referring to the left side accumulation chamber (14), the dump valve (49) is shown closed and the drip guard (45) preventing the dump valve (49) from opening prematurely. Once the level of the liquid (21b) rises to the level of the liquid as shown in (21c), then the dump valve (49) will open and dump the water through tube (19) just as previously described for the right side dump valve (49). It will of course be understood that the predetermined level at which the dump valve (49) opens can be adjusted by adjusting the size of the opening around O-ring (53) or adjusting the magnetic forces between the magnet (56) and the metal piece (55). Making the area of water in contact with the portion (52) of the dump valve (49) larger would cause the valve to dump quicker and making the area of (52) in contact with the liquid (21c or 21b) would cause the predetermined level to rise before the valve opens.

The water which is dumped into the conduits (19) travels down through T connector (68) and into tube (65) and then into T connector (68) and out openings in conduit (66). Plugs (71) are placed in the ends of the conduit (66). Any overflow liquid from the potted plants (18) will pass down through openings (63) in grid tray (62) and accumulate in the absorbent sponge member (61). Evaporation then from the sponge member (61) will provide a moist, healthful atmosphere for the potted plants in pots (18).

Accordingly, it will be appreciated that the present invention achieves all of the objects mentioned above. Obviously, many modifications and variations of the present invention are possible in light of the above teachings. It is therefore to be understood that, within the scope of the appended claims, the invention may be practised otherwise than as specifically described.

I claim:

1. A plant care apparatus comprising:
   a container means for holding a liquid to be delivered to plants, said container having an outlet opening in the bottom thereof and means for sealing the rest of the container means from entry of atmospheric air;
   consistent pressure chamber means fluidly connected to the container means outlet opening for holding a predetermined amount of liquid from said container means at a predetermined level, said consistent pressure chamber means including a passageway from the outlet opening of said container means down to said predetermined level whereby once the liquid in said consistent pressure chamber covers said passageway no more liquid will move from said container means to said consistent pressure chamber until some liquid is released from said consistent pressure chamber;
   an accumulation chamber having an inlet and an outlet;
   a fluid conduit leading from said consistent water chamber to said accumulation chamber;
   metering means for adjustably controlling the flow of liquid through said fluid conduit;
   level responsive means connected to said accumulation chamber for causing said accumulation chamber to fill and then automatically empty once the liquid in said accumulation chamber reaches a predetermined level, said level responsive means comprising a lever pivotally attached to said an accumulation chamber, one end of said lever being disposed under the outlet of the accumulation chamber, the other end of said lever being spaced from said outlet of the accumulation chamber, said other end thereof being composed of a magnetic material, said lever having a first position wherein said one end thereof seals said outlet of the accumulation chamber and the other end thereof is in contact with a magnet attached to said accumulation chamber, and a second position thereof wherein said one end is spaced from said outlet of the accumulation chamber when the weight of the fluid in the accumulation chamber overcomes the magnetic forces between the magnet and the other end of the lever, said other end of the lever being spaced apart from said magnet in the second position of the lever, and including biasing means for biasing the other end of said lever toward said magnet when there is no water in said accumulation chamber; and
   vent means in an upper portion of said consistent pressure chamber means.

2. The apparatus of claim 1 including a fluid harness means connected to the outlet of said accumulation chamber for directing liquid from the accumulation chamber to growing plants.

3. The apparatus of claim 2 wherein said apparatus is supported by a vertical frame; and
   leg means connected to the bottom of said vertical frame for maintaining said frame in a vertical disposition.

4. The apparatus of claim 3 including tray means having a bottom disposed above said leg means and attached to said vertical frame for holding growing plants in pots.

5. The apparatus of claim 4 including absorbent sponge means on the bottom of said tray means for collecting liquid running off of growing plants and a rigid grid tray supported above the absorbent sponge means, said grid tray having rigid legs extending through said absorbent sponge means and resting on the bottom of said tray means.

6. The apparatus of claim 5 including a plurality of potted plants disposed on said grid gray and said fluid harness means delivering fluid to all of said potted plants.

7. The apparatus of claim 1 including closure means for selectively closing said vent means when the container means is being filled.

8. The apparatus of claim 1 including drip guard means disposed in said accumulation chamber above said outlet for said accumulation chamber preventing drips from said fluid conduit, past said metering means from dripping directly onto said one end of the lever to prevent premature opening thereof.

9. The apparatus of claim 1 wherein said biasing means comprises the other end of the lever being heavier than said one end thereof and said magnet being disposed below said other end of the lever.

10. The apparatus of claim 1 including:
    a second accumulation chamber having an inlet and an outlet;
    a second fluid conduit leading from said consistent water chamber to said second accumulation chamber;
    second metering means for adjustably controlling the flow of liquid through said second fluid conduit;

second level responsive means connected to said second accumulation chamber for causing said second accumulation chamber to fill and then automatically empty once the liquid in said second accumulation chamber reaches a predetermined level, said second level responsive means comprising a second lever pivotally attached to said second accumulation chamber, one end of said second lever being disposed under the outlet of the second accumulation chamber, the other end of said second lever being spaced from said outlet of the second accumulation chamber, said other end thereof being comprised of a magnetic material, said second lever having a first position wherein said one end thereof seals said outlet of the second accumulation chamber and the other end thereof is in contact with a second magnet attached to said second accumulation chamber, and a second position thereof wherein said one end of the second lever is spaced from said outlet of the second accumulation chamber when the weight of the fluid in the second accumulation chamber overcomes the magnetic forces between the second magnet and the other end of the second lever, said other end of the second lever being spaced from said second magnet in the second position of the second lever, and including second biasing means for biasing said other end of said second lever toward said second magnet when there is no water in said second accumulation chamber.

11. The apparatus of claim 10 wherein said second biasing means comprises the other end of the second lever being heavier than said one end thereof and said second magnet being disposed below said other end of the second lever.

12. The apparatus of claim 1 including:
a fill opening at the top of said container means; and
means for selectively sealingly closing said fill opening once said container means is filled.

* * * * *